(12) United States Patent
Van Stiphout et al.

(10) Patent No.: US 11,828,315 B2
(45) Date of Patent: Nov. 28, 2023

(54) VISION ADJUSTING MECHANISM

(71) Applicant: MCi (Mirror Controls International) Netherlands B.V., Woerden (NL)

(72) Inventors: Paulus Gerardus Maria Van Stiphout, Woerden (NL); Anne Catharina Martha Bekker, Woerden (NL); Alex Lorier, Woerden (NL); Tom Adriaan Jansen, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 164 days.

(21) Appl. No.: 17/427,176

(22) PCT Filed: Jan. 30, 2020

(86) PCT No.: PCT/NL2020/050050
§ 371 (c)(1),
(2) Date: Jul. 30, 2021

(87) PCT Pub. No.: WO2020/159367
PCT Pub. Date: Aug. 6, 2020

(65) Prior Publication Data
US 2022/0099117 A1     Mar. 31, 2022

(30) Foreign Application Priority Data
Jan. 31, 2019 (DE) .......................... 202019100579.3

(51) Int. Cl.
| | |
|---|---|
| *B60R 1/062* | (2006.01) |
| *F16B 2/24* | (2006.01) |
| *F16B 5/06* | (2006.01) |
| *G02B 7/182* | (2021.01) |

(52) U.S. Cl.
CPC .............. *F16B 2/248* (2013.01); *B60R 1/062* (2013.01); *F16B 5/0614* (2013.01); *G02B 7/182* (2013.01)

(58) Field of Classification Search
CPC ......... B60R 1/062; B60R 1/072; G02B 7/182; F16B 2/248
USPC .................................................. 359/872, 877
See application file for complete search history.

(56) References Cited

U.S. PATENT DOCUMENTS

| | | | |
|---|---|---|---|
| 4,158,483 A * | 6/1979 | Fisher .................... | B60R 1/072 359/876 |
| 4,401,289 A | 8/1983 | Fisher et al. | |
| 4,555,166 A * | 11/1985 | Enomoto ................ | B60R 1/072 248/479 |

(Continued)

*Primary Examiner* — Ricky D Shafer
(74) *Attorney, Agent, or Firm* — Volpe Koenig

(57) ABSTRACT

The present invention relates to a vision adjustment mechanism, comprising a first part and a second part pivotably arranged thereto. The first part has a trough, into which a head part at least partially complementary to said trough can be inserted, forming at least one clamping gap between the trough and the head part. The second part has at least one clamping part, which is formed to be complementary to the clamping gap and can be arranged in the latter such that the second part is fixed to the first part to be pivotable thereto. The fixing means is formed in such a way that it biases the head part in the direction towards the first part for fixing the two parts, and it fixes the second part against rotation relative to the first part. The invention also relates to a mirror unit having such a vision adjustment mechanism.

17 Claims, 5 Drawing Sheets

(56) References Cited

U.S. PATENT DOCUMENTS

| | | | | |
|---|---|---|---|---|
| 4,764,004 | A * | 8/1988 | Yamada | G02B 7/1824 |
| | | | | 403/123 |
| 4,776,231 | A * | 10/1988 | Cummins | B60R 1/06 |
| | | | | 359/872 |
| 5,363,246 | A * | 11/1994 | Perry | F16C 11/0661 |
| | | | | 248/483 |
| 5,568,326 | A * | 10/1996 | Yoshida | B60R 1/072 |
| | | | | 248/478 |
| 5,629,810 | A | 5/1997 | Perry et al. | |
| 5,946,151 | A * | 8/1999 | Levko | B60R 1/072 |
| | | | | 359/872 |
| 5,969,891 | A * | 10/1999 | Otenio | B60R 1/06 |
| | | | | 359/872 |
| 6,341,536 | B1 * | 1/2002 | Guttenberger | B60R 1/072 |
| | | | | 74/502.1 |
| 9,405,090 | B2 * | 8/2016 | van Stiphout | G02B 7/1822 |
| 2002/0149865 | A1 | 10/2002 | Ishigami | |
| 2003/0017724 | A1 * | 1/2003 | Tsuyama | B60R 1/072 |
| | | | | 439/13 |
| 2016/0144790 | A1 * | 5/2016 | Kim | B60R 1/072 |
| | | | | 248/479 |
| 2016/0264055 | A1 * | 9/2016 | Chong | B60R 1/072 |

\* cited by examiner

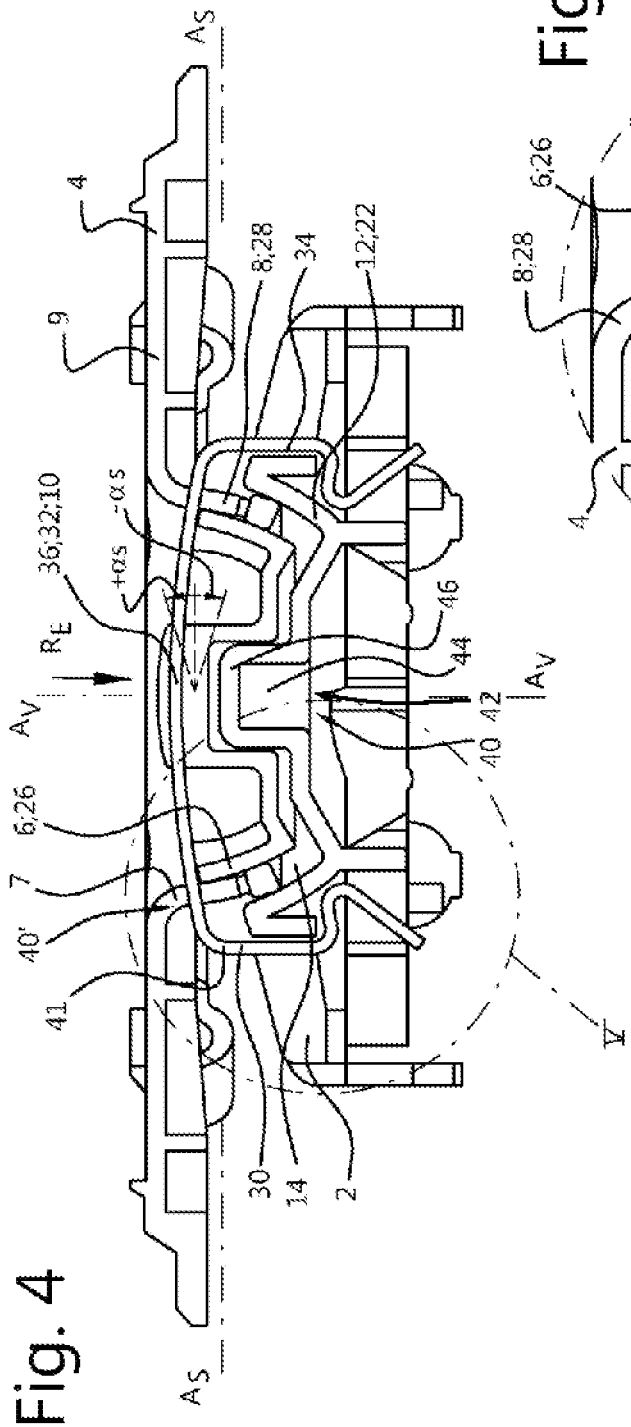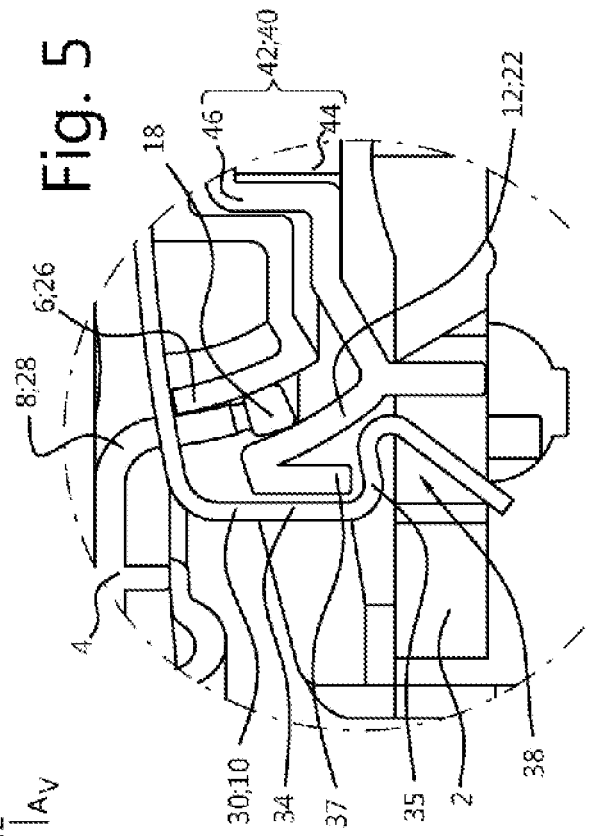

VISION ADJUSTING MECHANISM

CROSS REFERENCE TO RELATED APPLICATIONS

This application is a 35 USC § 371 National Stage application of International Patent Application No. PCT/NL2020/050050, which was filed Jan. 30, 2020, entitled "VISION ADJUSTING MECHANISM" which claims priority to German Patent Application No. DE202019100579.3, filed Jan. 31, 2019 and is incorporated herein by reference as if fully set forth.

The present invention relates to a vision adjustment mechanism, in particular for a wing mirror or a camera unit of an automotive vehicle, comprising a first part, in particular a base part, and a second part arranged to be pivotable relative thereto, in particular a mirror holder part, wherein the first part has a trough, into which a head part that is at least partially complementary to said trough is insertable, forming at least one clamping gap between the trough and the head part and fixable relative to the first part by means of a fixing means, and wherein the second part has at least one clamping part, which is formed to be at least partially complementary to the clamping gap and arrangeable therein in such a manner that the second part is attached to the first part so as to be pivotable relative thereto.

Such vision adjustment mechanisms are known from the state of the art. The pivotable arrangement of the two parts with respect to one another allows, for example, the adjustment of a mirror or a camera to provide an optimal angle of vision for the vehicle user. They can be formed, for example, to adjust the pivot angle between the first part and the second part by manual, sometimes also electric means. The vision adjustment mechanisms are mostly of plastic material. One possible embodiment of such a vision adjustment mechanism is shown, for example, in US 2011/0051271 A1.

Depending on the area of application, such mechanisms are subject to external forces, which can cause undesirable displacement between the first part and the second part. This can be caused, for example, by the driving operation of the automotive vehicle on which the vision adjustment mechanism is mounted. To prevent undesired displacement of the first part relative to the second part, the connection between the first and second parts is provided with suitable securing means, for example biasing elements, frictional engagement elements etc., which allow adjustment between the first and second parts only after overcoming a predefined force threshold. With the mechanisms, in particular made of plastic material, this is a problem, however, since plastic material evades tensions, among other things due to the shrinkages and creep behavior intrinsic to the material thereby sometimes changing the force threshold required for adjusting the second part relative to the first part. Apart from changing this force threshold it has also been observed that the pivot axis of the vision adjustment mechanism can be displaced over time, thus no longer ensuring reproducible pivoting of the vision adjustment mechanism.

It is the object of the present invention to provide a mechanism that is easily and cost-effectively manufactured and which does not have, in particular, the above-mentioned problems.

The object is achieved by a vision adjustment mechanism described herein and a mirror unit comprising the vision adjustment mechanism.

In particular, the object is achieved by a vision adjustment mechanism, in particular for a wing mirror of an automotive vehicle, comprising a first part, in particular a base part, and a second part arranged to be pivotable relative thereto, in particular a mirror holder part, wherein the first part has a trough, into which a head part that is at least partially complementary to said trough is insertable, forming at least one clamping gap between the trough and the head part and fixable relative to the first part by means of a fixing means, and wherein the second part has at least one clamping part, which is formed to be at least partially complementary to the clamping gap and arrangeable therein in such a manner that the second part is attached to the first part so as to be pivotable relative thereto, wherein the fixing means is formed in such a way that it biases the head part in the direction toward the first part and, in particular, the trough, and in that the fixing means forms a rotation-fixing means in such a manner that the second part is fixed against rotation relative to the first part and in particular fixed against rotation about an axis $A_V$ orthogonal to at least one pivot axis $A_S$, about which the second part is pivotable relative to the second part.

Furthermore, the object is achieved by a mirror unit and, in particular, a wing mirror for an automotive vehicle, comprising a vision adjustment mechanism as provided here, wherein at least one mirror element or a camera unit is arranged on the second part.

The core of the invention is the formation of a trough on the first part, which can be easily and cost-effectively achieved, in particular, when the vision adjustment mechanism is made of a plastic material, and the arrangement of at least the one clamping part and the head part in a stacked configuration. The formation of the trough allows a very space-saving configuration and, in particular, one that is space-saving in the vertical direction of the mechanism, i.e., in a direction orthogonal to the planned pivot plane of the mirror. By providing a mechanism having a very small number of components, namely the first part, the second part, the head part and the fixing means, this ensures moreover cost-effective manufacture with at the same time extreme ease of assembly, wherein the resulting vision adjustment mechanism is unaffected by material shrinkages, in particular.

The vision adjustment mechanism can be formed in such a way that the second part with its clamping part is inserted into the trough of the first part, then the head part is fitted thereon by forming the clamping gap and clamping the clamping part, and the head part and the first part can be connected with each other by means of the fixing means. Separating the vision adjustment mechanism is then optionally possible in the reverse order, provided that the fixing means is formed to be detachable.

The fixing means is formed in such a way that it biases the head part in the direction toward the first part and the trough, in particular. In this way, material shrinkages and relaxation can be countered, in particular. The force with which the head part is pressed into the trough, or the clamping part is clamped in the clamping gap, can be used to adjust the pivoting force between the first and second parts. The force is preferably chosen such that inadvertent displacement of the vision adjustment mechanism, and in particular pivoting between the first and second parts is prevented during the normal operation of the vision adjustment mechanism. Pivoting between the first and second parts can only happen on exceeding a predefined adjustment force. Since, as mentioned before, the fixing means forms a rotation fixing means in such a manner that the second part is rotationally fixed relative to the first part and, in particular, about an axis $A_V$ orthogonal to at least one pivot axis $A_S$, about which the second part is pivotable relative to the first part, is rotationally fixed and/or rotationally fixed orthogonal to the pivot plane, a vision adjustment mechanism is achieved which ensures reliable and reproducible pivotability of the second part relative to the first part even after long use and with easy completability.

Optionally, the holder part is formed as a mirror holder part.

Optionally, the clamping part is arranged in the clamping gap under frictional engagement and, in particular, slidingly movably arranged in the clamping gap. The frictional engagement, or the resulting frictional force, allows the adjustment of the adjusting force of the vision adjustment mechanism. The frictional engagement prevents, in particular, inadvertent displacement of the vision adjustment mechanism, or pivoting out of the pivot plane. When the first part is pivoted relative to the second part, the clamping part optionally slides within the clamping gap from one position to another position.

It is possible to form the vision adjustment mechanism and, in particular, at least one of the parts forming the vision adjustment mechanism, namely the first part, the second part, the head part and the fixing means, in such a manner that the pivoting force, or the force threshold which is to be overcome for adjusting the first part relative to the second part, varies in dependence on the pivoting angle. The vision adjustment mechanism can be formed in such a way, for example, that the force threshold increases or decreases as the pivoting angle is increased. This is possible, for example, by adapting the shapes of the trough and/or the clamping part. This will be discussed in detail in the following.

Optionally, the first part and the head part, as soon as they are fixed by means of the fixing means, form a fixedly connected unit. The result is a clamping gap in which the clamping part is securely guided. It is conceivable to firmly fix the head part relative to the first part by at least one axis. It is thus conceivable, for example, that small pivoting motions of the head part are possible with respect to the first part, in particular, in a mirror pivot plane, and that a torsion, i.e. a rotation about an axis vertical to this mirror plane, is prevented. To achieve this, a suitable rotation fixing means can be used, as will be described in detail in the following.

Optionally, the head part is insertable into the trough along an insertion direction $R_E$, which extends orthogonal to the pivot plane of the vision adjustment mechanism, in particular, and/or orthogonal to a main plane $E_H$ of the trough. The main plane $E_H$ is preferably formed parallel to the pivot plane. The pivot plane can be formed to be co-planar to the mirror plane. The main plane $E_H$ is preferably the main extension plane of the vision adjustment mechanism. The main plane $E_H$ is optionally the plane in which the pivoting axes of the mechanism extend and, in particular, the pivot plane. Optionally, at least two pivoting axes are provided about which the vision adjustment mechanism, or the first part relative to the second part, can be pivoted. The insertion direction is optionally formed to be coaxial to the main vertical axis $A_V$ of the vision adjustment mechanism.

Optionally, the trough has an insertion opening via which the head part is insertable into the trough along a first insertion direction $R_E$ and fixable there by means of the fixing means, in particular against removal in the direction opposite the insertion direction $R_E$ and/or removable therefrom after detaching the fixing means. The clamping part can also be optionally inserted into the trough along this insertion opening. Optionally, the vision adjustment mechanism is formed in such a manner that the clamping part is insertable into the trough along the insertion opening, and thereafter the head part is also insertable into the trough along the insertion direction onto the clamping part. What is thus formed is a stacked arrangement between first part, second part and head part.

Optionally, the second part is pivotable relative to the first part about at least one pivot axis $A_S$ extending orthogonally to an insertion direction $R_E$ and in particular to the above-mentioned insertion direction $R_E$, and in particular along which the head part is insertable into the trough. The insertion direction is optionally formed orthogonal to at least one pivot axis $A_S$ between the second and the first part.

Optionally, the trough and the head part are formed in a manner complementary to each other so as to form a ball joint with the interposition of the clamping part.

Optionally, the trough at least partially has a trough sidewall having a geometric shape which corresponds to the geometric shape of the sidewall of a spherical layer of a first sphere or a layer of a volume body being equally rotationally symmetrical. The rotational symmetry is optionally defined about an axis of rotation orthogonal to the pivot axis $A_S$ and, in particular, to the vertical axis, which optionally extends parallel to the insertion direction $E_H$. It is also conceivable that the rotation axis extends optionally orthogonal to the pivot plane and/or to the main plane $E_H$. The above-mentioned rotation symmetrical volume body can be a volume body, for example, which is created by the rotation of a parable, a funicular curve or similar curve about an axis extending through its apex. A layer of the body optionally forms a basin or cup shape, in particular including the associated bottom of the cup or basin. Optionally, at least one opening is provided, in particular, at the top collar and/or at the bottom collar of the layer. Such an opening can be, for example, the above-described insertion opening.

The trough sidewall can extend over the circumference of the layer and, in particular, in relation to the rotation axis around 360°, i.e. can have, in particular, a full annular shape. However, it is also possible to form the trough sidewall as at least one segment and, in particular, in the shape of at least one trough sidewall section, extending around a circumferential angle of <360°. Basically, this also applies to a trough having a rotationally symmetrical external shape, or sidewall, that is an annulus etc., however, it is also applicable to a trough having a non-rotation-symmetric sidewall shape, for example, the shape of an ellipse or another shape.

Optionally, at least one, preferably two trough sidewall sections are provided which are optionally formed in such a manner that they define an insertion space for the head part so that the clamping gap is formed between the trough sidewall and the head part.

Optionally, the head part at least partially has a head part sidewall having a geometric shape corresponding to the geometric shape of the sidewall of a spherical layer of a second sphere or the layer of a volume body being equally rotationally symmetrical, and in particular a second sphere or a second volume body being equally rotationally symmetrical, which is smaller than the first sphere or the first rotationally symmetric volume body, as described above. For all special versions of such a head part sidewall, the description given above with reference to the trough sidewall applies optionally in an identical or comparable manner. For example, among other things, the head part can comprise at least one head part segment etc.

The head part sidewall and the trough sidewall are optionally formed to be complementary to each other so that they can be stacked relative to one another. In this way, the head part can be inserted into the trough wherein the clamping gap is created between the head part and the trough or the head part sidewall and the trough sidewall. The head part and the trough, or the head part sidewall and the trough sidewall, optionally at least partially comprise the same geometric shape, however with different sizes, wherein the head part is optionally smaller than the trough. The above-mentioned second sphere, or the second volume body, are optionally formed in such a manner that they are formed to be smaller than the first sphere or the first volume body by an amount of the clamping gap. Again, the same applies as was mentioned with relation to the trough sidewall and the volume bodies mentioned there.

Optionally, the clamping part at least partially has a clamping part sidewall, having a geometric shape at least partially corresponding to the geometric shape of the sidewall of a spherical layer of a third sphere or a layer of a third volume body being equally rotationally symmetrical, and in particular a third sphere or a third volume body being equally rotationally symmetrical, that is smaller than the first sphere, or the first rotationally symmetrical volume body, as it was defined with relation to the trough sidewall and/or larger than the second sphere, or the second rotationally symmetrical volume body, as it was defined in relation to the clamping part sidewall. Again, the same applies as was mentioned in relation to the trough sidewall and volume body mentioned there. Furthermore, again optionally, it applies that the clamping part, or the clamping part sidewall, are formed in such a manner that the clamping part and the trough can be stacked one into the other and/or the clamping part and the head part are formed to be stacked one within the other. As already initially mentioned, the shape of the trough and/or of the clamping part and/or of the head part allows the frictional engagement action of the individual parts to be defined with respect to each other. The adjustment force between the first and second parts can also be adjusted. For example, a cross-sectional shape having an angle of inclination of the trough sidewall and/or the clamping part and/or the head part varying over the pivot angle of the vision adjustment mechanism allows the resulting frictional forces to be influenced. Optionally, the trough and/or the clamping part and/or the head part at least partially has a geometric shape having an angle of inclination that is reduced in the vertical direction, i.e., in the direction towards the trough bottom. Such a shape can be a parabolic shape or a similar funicular curve shape.

Optionally, the head part and the trough and/or the head part and the clamping part and/or the trough and the clamping part at least in relation to each of their opposing sidewalls are at least partially formed as rotation bodies, having a common rotation body axis $A_V$.

Optionally, the clamping part has at least one frictional element, which is provided in the form of a thickening and/or a protrusion, in particular on the clamping part sidewall of the clamping part, and being in frictional engagement with a trough sidewall and/or a head part sidewall in the clamping gap. Such a frictional element can be formed, for example, on a free end of the clamping part. The frictional element can be formed, for example, on a free collar of a correspondingly formed clamping part. The arrangement of a plurality of frictional elements is also conceivable. It is conceivable to form frictional elements in such a manner that they come into frictional engagement only at a certain pivoting angle to thus define, for example, varying frictional forces over the extension of the pivoting angle.

The frictional element is optionally integrally formed with the clamping part. Furthermore, the trough is optionally integrally formed with the first part. Optionally, the clamping part is also formed with the second part. Optionally, the clamping part, in the region of the insertion opening for the head part, comprises a collar region on which at least one retaining means is formed for receiving at least one mirror element. This retaining means is optionally integrally formed with the trough. Optionally, the clamping part protrudes from the surface and, in particular, from the underside of the second part. Optionally, the clamping part is formed as a trough in the second part. This trough, also referred to as a clamping part trough in the following, is optionally formed to be complementary to the trough in the first part, however optionally has smaller dimensions, so that the clamping gap is formed between the two troughs. Reference is made in this context to the previous passage with respect to the sidewalls which are not fully circumferentially formed but only partially formed to be circumferential. The trough and/or clamping part trough can also be formed as a segment, i.e., having a sidewall that circumferentially extends over less than 360°. Optionally, at least one mirror is arrangeable on the upper surface of the second part. Optionally, a retaining means for holding the at least one mirror is provided on the upper surface. The head part is optionally formed to be complementary to the clamping part trough so that it can be inserted into the clamping part trough, preferably in a fit true to size and/or with frictional engagement with the clamping part trough sidewall and, in particular, with the frictional elements provided there.

Optionally, the fixing means has at least one tension spring means fixable on the first part and on the head part while applying a mutual biasing. In this way, a bias can be applied between the first and second parts, which causes a clamping force on the clamping part and is independent, in particular, from any relaxations of the component materials of the head part, clamping part and trough. The head part is thus biased in the direction towards the first part and a continuously uniform clamping force is created in the clamping gap and acts on the clamping part.

Optionally, the fixing means extends between the first part and the head part. The fixing means also optionally penetrates the second part and, in particular, the clamping part. Depending on the configuration of the fixing means, rotational fixing can be achieved in this manner preventing rotation of the clamping part and thus the second part relative to the first part and/or the head part. The rotation optionally relates to an axis vertical to the pivot plane of the vision adjustment mechanism. The rotation optionally relates to a rotation axis about which the first part is mounted in the trough to be rotatable relative to the second part when the fixing means is not applied.

Optionally, the fixing means includes at least one rotation fixing element extending external to the rotation axis $A_V$ about which the first part is mounted in the trough to be rotatable relative to the second part when the fixing means is not applied, or the vertical axis and, in particular, at a distance to this axis $A_V$. In this way, the fixing element can function as a rotational fixing means. Optionally, the second part and, in particular, the clamping part comprises a rotation stop against which the fixing element forming a rotation fixing element and, in particular, the above rotation fixing element abuts in a rotation fixing manner to prevent rotation of the second part relative to the first part. Optionally, such a rotation stop can be a slot, an opening or the like passage into which at least a portion of the fixing means, or the rotation fixing element, protrudes and/or which penetrates the second part.

Optionally, the fixing means comprises at least one fixing element which can be fixed on at least one counter fixing element on the first part and/or the head part, or vice versa.

Optionally, the fixing means has a bracket element comprising at least two bracket arms and a bracket head formed, in particular, between the bracket arms, wherein at least one fixing element is formed, in particular, on the end regions of the bracket arms, which is fixable on at least one counter fixing element on the first part and/or wherein the bracket head is fixable on the head part. One part of the bracket element, in particular at least one bracket arm can form the rotation fixing element. The fixing of the bracket head on the head part is optionally also achieved by at least one fixing element and at least one counter fixing element. Such an arrangement can be, for example, a mount, into which the bracket head can be inserted. Such a mount can be, for example, also a clamping mount, in which the bracket head is mountable in a manner that can be clamped. Fixing of the bracket head can be along at least one axis. It is thus conceivable, for example, to mount the bracket head on the head part in such a way that it is rotatable and/or displaceable along its main extension axis, it is, however, fixed orthogonal thereto and, in particular vertical to the pivot plane. It is conceivable to form the fixing means and, in particular, the fixing means formed as a bracket element, in such a manner that it embraces the head part and faces with its bracket arms, in particular while penetrating the second part, in the direction towards the first part and can be fixed there. By the embracing configuration, secure fixing of the head part is ensured.

Optionally, the fixing means is formed as a snap engagement means, which can be brought into a fixing snap engagement, in particular without the use of a tool, with the first part and/or the head part and/or can be disengaged from a fixing snap engagement with the first part and/or the head part, in particular only by means of a detachment tool. When the fixing means is formed as a snap engagement means, in particular, extremely easy assembly of the visual adjustment mechanism is possible. To prevent undesirable loosening of the vision adjustment mechanism or the individual components relative to each other a detachment tool is optionally necessary for dismantling.

Optionally, an insertion guide is provided between the first part and the head part, in particular, with a guiding means on the first part and in particular in the trough and with a complementary counter guiding means on the head part for guiding the head part relative to the trough during insertion into a predefined fixing position. Such an insertion guide can be, for example, a protrusion formed in the trough which comes into sliding engagement in a protrusion receiver on the head part. Optionally, the protrusion is formed such that it allows vertical displacement, i.e., vertical to the pivot plane and/or coaxial to the insertion direction as described before, but does not allow displacement orthogonal thereto and, in particular, in the direction of the pivot axes $A_S$. The insertion guide is optionally coaxially formed to the axis $A_V$ and, in particular, this axis $A_V$ extends through this insertion guide. Such an insertion guide can be optionally formed as a rotation fixing means to prevent rotation of the head part relative to the first part. A possible embodiment is, for example, a complementary configuration of a guiding means and the counter guiding means with a rotation prevention element which interlocks the two means with respect to each other. As such a rotation prevention means, the guiding means can have at least one protrusion, for example a corner, and/or a recess which comes into a rotation preventing engagement in a complementary protrusion receiver, or embraces a complementary protrusion.

As mentioned above, the head part and the trough and/or the head part and the clamping part and/or the trough and the clamping part are optionally formed, at least in relation to each of their opposite sidewalls, at least partially as rotation bodies having a common rotation body axis $A_V$. Optionally, it is conceivable, in particular, in this context, that the fixing means connects the first part with the head part at a location offset to this rotation body axis. Rotational fixing is also achieved in this manner. The fixing means is optionally formed in such a way that it prevents rotation of the head part with respect to the trough and/or of the head part with respect to the clamping part and/or of the trough with respect to the clamping part. Again, the rotation optionally relates to a rotation about the vertical axis $A_V$.

Optionally, it should be understood that the features described here mean those features in the assembled state of the vision adjustment mechanism unless indicated differently. The assembled state means that the first and second parts are connected to each other via the head part and the fixing means.

As already mentioned, the invention not only relates to a vision adjustment mechanism but also to a mirror unit comprising such a vision adjustment mechanism, wherein reference is made to all of the embodiments of this vision adjustment mechanism described above to avoid redundancy. All of the variants described here can be combined with such a mirror unit.

Further embodiments of the invention can be derived from the dependent claims.

The invention will be described in the following with respect to an exemplary embodiment which will be explained in more detail by the accompanying drawings, in which:

FIG. 4 shows a further cross-section of the embodiment of FIG. 1;

FIG. 5 shows a detail of the cross-section of FIG. 4;

In the following the same and equivalent components will be indicated using the same reference numerals, wherein high indices may sometimes be used.

Figure 1:
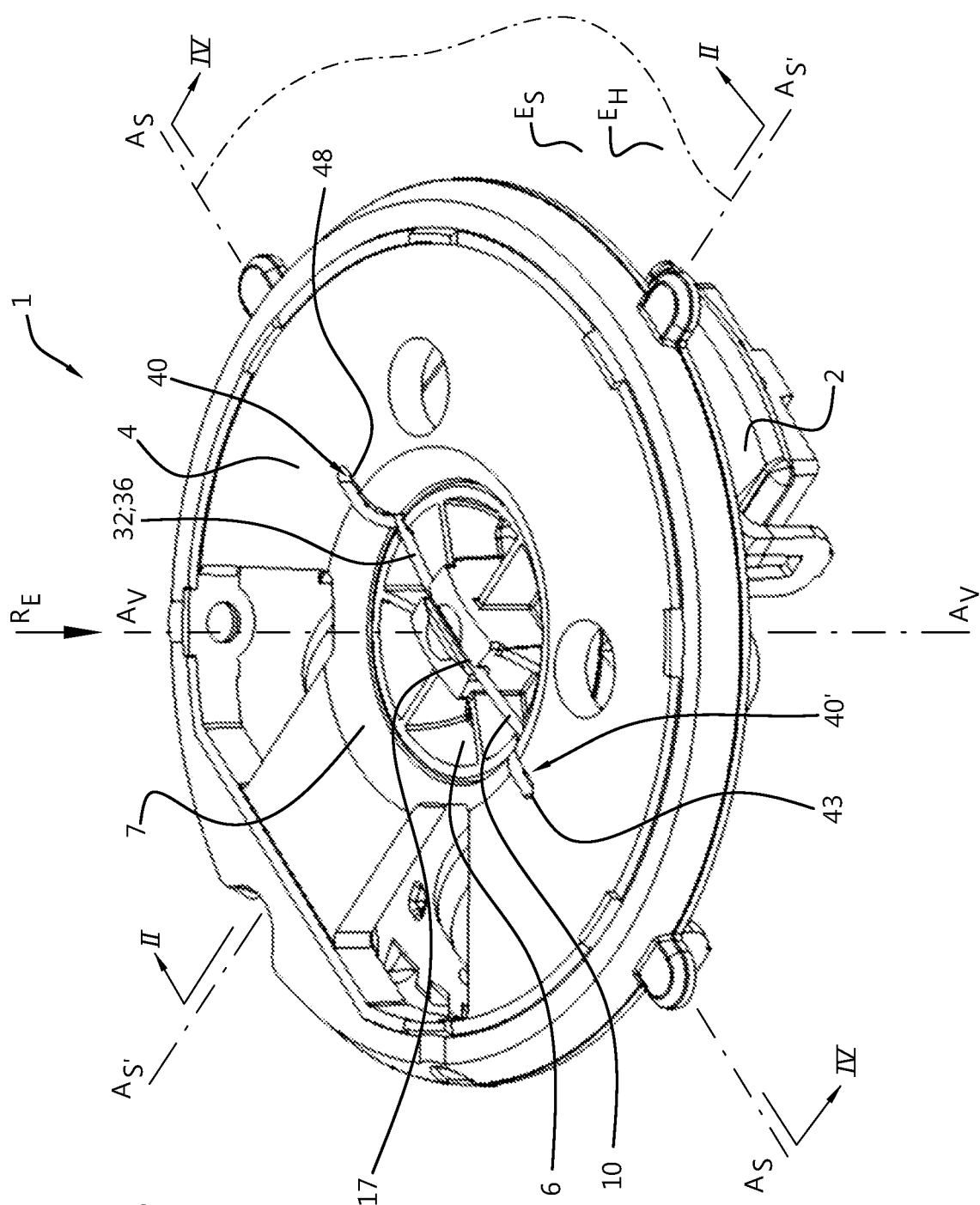
FIG. 1 shows a perspective view of an embodiment of a vision adjustment mechanism according to the present invention.
Figure 2:
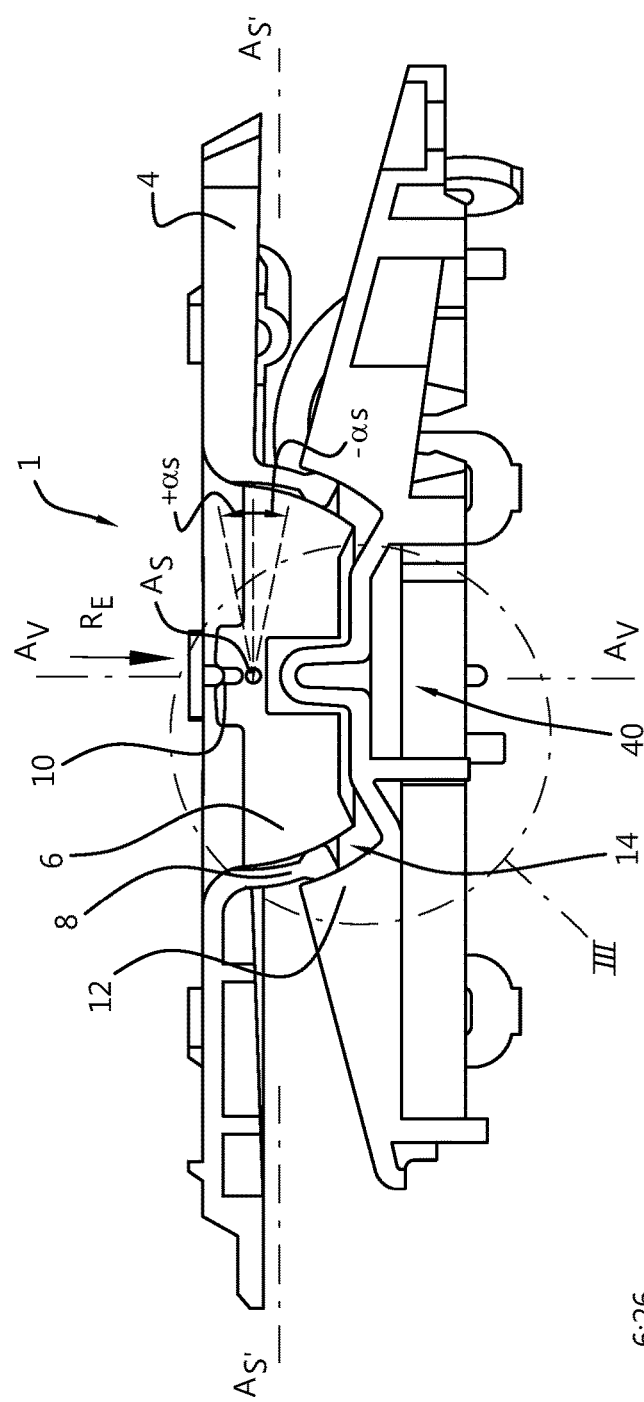
FIG. 2 shows a cross-section of the embodiment of FIG. 2.
Figure 3:
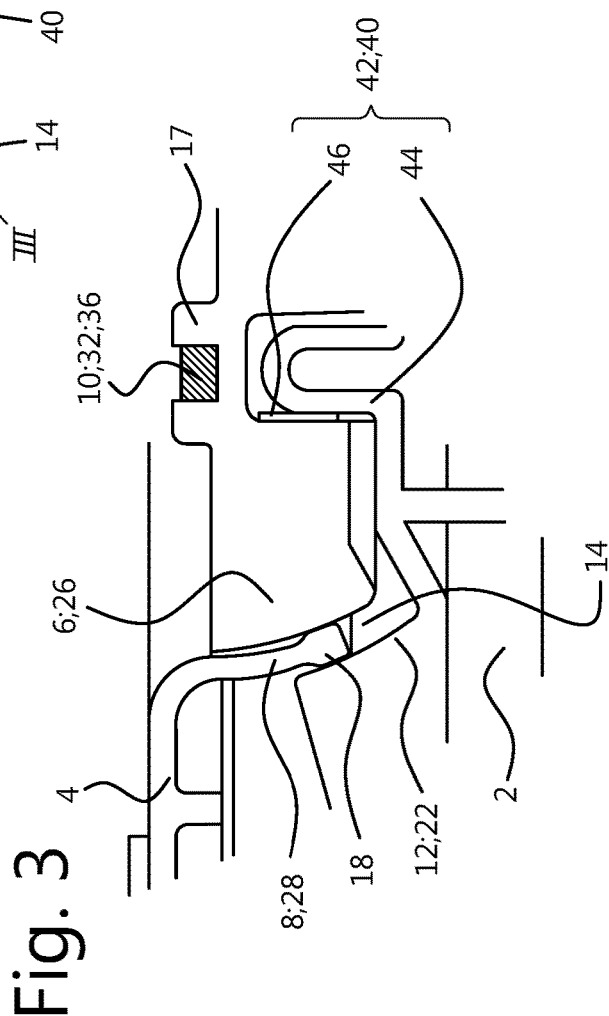
FIG. 3 shows a detail view of the cross-section of FIG. 2.

Unless defined otherwise, all the terms used herein (including technical and scientific terms) have the same meaning and, in particular, a meaning as it is generally understood by a person of average skill in the art, when they are interpreted in the context of the description and the drawings. It is further understood that terms such as those which are defined in generally used dictionaries, are interpreted with reference to the technical field in question, rather than in an idealized or in an exaggerated formal sense, unless they are explicitly thus defined. In particular cases a detailed description of generally known apparatus and methods can be omitted to avoid redundancy of the description. The description of particular embodiments and the terminology used therein is not intended to limit the invention. The singular forms "a/an", and "the" may also include the plural forms unless the context unequivocally suggests otherwise. The expression "and/or" includes any and all combinations of one or more of the associated listed objects. It should be understood that the terms "comprises" and/or "comprising" indicate the presence of the features mentioned, do not preclude, however, the presence or the addition of one or more other features. Furthermore, it should be understood that when a particular step of a method is indicated as following another step, it can follow this other step directly, or one or more intermediate steps can be performed before performing the particular step, unless otherwise indicated. In the same manner, it should be understood that when a connection between structures or components is described, this connection can be direct or with the interposition of intermediate structures or components, unless otherwise specified. All publications, patent applications, patents and other literature cited here is incorporated in its entirety by reference. In the case of a conflict, the present specification, including its definitions, should apply.

The invention will be described with reference to the accompanying drawings in which embodiments of the invention are shown. However, the invention can also be embodied in many different forms, and should not be understood to be limited by the embodiments shown here. Rather, the embodiments are indicated here so that the present disclosure is exhaustive and complete and discloses the scope of the invention to the person skilled in the art in a complete, but exemplary manner. The description of the exemplary embodiments should be read in conjunction with the accompanying drawings which are deemed as part of the entire written description. In the drawings, the absolute and relative sizes of systems, components, layers and regions may be shown in an exaggerated manner for reasons of clarity. Embodiments can also be described with reference to schematic and/or cross-sectional illustrations, idealized embodiments and intermediate structures of the invention. Relative terms as well as their derivatives are to be understood to relate to the posture as described or shown in the context of the drawing in question. These relative terms serve the purpose of a clearer description and do not require that the system be installed or operated in a particular posture, unless explicitly otherwise indicated. Any of the disclosed apparatus or parts thereof can be combined together or separated into further parts unless specifically otherwise indicated. The mere fact that particular measures are indicated in different parts or claims should not indicate that a combination of these measures cannot be advantageously obtained. In particular, all conceivable combinations of the claims should be deemed as inherently disclosed. In the present description, words such as "essentially", "approximately" or "in general/generally" are to be interpreted in a way so as to include at least deviations of a dimension of 10% or less, preferably 5% or less, or deviations from a shape which would fall within the associated definition for a person skilled in the art, unless otherwise specified.

For reasons of clarity and to achieve a concise description, features are mostly described as part of one or separate embodiments; it should be understood, however, that the scope of the invention can also comprise embodiments which include combinations of all or some of the described features.

FIGS. 1 to 6 show a vision adjustment mechanism in different views and section views. Various embodiments of the vision adjustment mechanism according to the present invention will be described in the following with reference to these drawing views, wherein the embodiments described are applicable alone, but also in combination with other embodiments here described.

As shown in FIG. 1, in particular, the vision adjustment mechanism according to the present invention comprises a first part 2, in particular a base part, and second part 4 arranged to be pivotable relative thereto, in particular a mirror holding part. The pivotability is optionally about the pivot axes $A_S$ as shown here, wherein the pivot axes shown here define a main plane $E_H$, or pivot plane $E_S$. There are further pivot axes in the optionally provided spherical joint bearing between the first part and the second part; in the present embodiment, the first part is pivotable about a plurality of axes within the pivot plane $E_S$. Orthogonal to this pivot plane $E_S$, there is optionally a vertical axis $A_V$, here formed to be coaxial to an insertion direction $R_E$.

The first part 2 comprises a trough 12, into which a head part 6 at least partially complementary to this trough 12 is insertable forming at least one clamping gap 14 between trough 12 and head part 6. This is shown in detail, in particular, in FIGS. 2 to 5. The head part 6 is fixable relative to the first part 2 via a fixing means 10.

The second part 4 comprises at least one clamping part 8 formed to be at least partially complementary to the clamping gap 14 and arrangeable with respect thereto in such a way that the second part 4 is fixed to the first part 2 and is pivotable relative thereto.

As shown in FIGS. 2 to 5, when the second part 4 is pivoted relative to the first part 2 about at least one axis $A_S$, a maximum pivoting angle $\pm\alpha_S$ can be assumed.

The fixing means 10 is formed in such a way that it biases the head part 6 in the direction towards the first part 2 and in particular the trough 12. This is shown in detail in FIGS. 4 and 5. The fixing means comprises optionally at least one tension spring means 30 which is fixable to the first part 2 and/or the head part 6 while applying mutual biasing. The fixing means 10 can extend, in particular, between the first part and the head part 6, wherein it penetrates the second part 4 and, in particular, the clamping part 8. This is shown in detail, for example, in FIGS. 1, 4, 5 and 6. The second part 4 optionally comprises at least one penetration opening 48. Corresponding penetration openings 48' can also be provided in the first part 2.

The fixing means 10 optionally comprises a bracket element 32 having at least two bracket arms 34 and a bracket head 36 formed, in particular, between the bracket arms 34. As shown, in particular, in FIGS. 4 to 6, at least one fixing element 35 can be formed on end regions 38 of the bracket arms 34, which is fixable on the first part 2 by means of at least one counter fixing element 37. It is also conceivable that the bracket head 36 is fixable, in particular, on the head part 6 via corresponding fixing elements and counter fixing elements. Such a fixing element on the head part is indicated with reference numeral 17 in FIGS. 1 and 6, for example. It is optionally formed in such a manner that it fixes and, in particular, clamps the fixing element 10 on the head part.

Optionally, the fixing means is formed as a snap engagement means, which can be brought into a fixing snap engagement with the first part 2 and/or the head part 6 without, in particular, the need of a tool. It is also conceivable to form the fixing means in such a way that it can be brought out of a fixing snap engagement with the first part 2 and/or the head part 6, in particular, only by means of a corresponding detachment tool. Such a snap engagement is shown, for example, in FIGS. 4 and 5.

As shown, in particular, in FIGS. 1, 4, and 5, the fixing means 10 is also formed as a rotation fixing means, wherein the second part 4 is rotationally fixed with respect to the first part 2, and rotationally fixed, in particular, about the vertical axis $A_V$, or rotationally fixed about an axis $A_V$ about which the first part is rotatable relative to the second part when a fixing means is not mounted. To achieve this, at least one rotation fixing element 41 of the fixing means 10 can be arranged to be eccentric, or at a distance to the vertical axis $A_V$; in this case, for example, the at least one bracket arm 34. Optionally, the rotation fixing element can be formed in such a way that it extends at the position eccentric to the vertical axis $A_V$ between the second part and the first part and, in particular, penetrates the clamping part 8. This also optionally applies to the tension spring means 30. Optionally, the fixing means is fixed on the head part 6, extending from there, while penetrating the clamping part 8, to the first part 2 and is formed to be fixable there. Optionally, the second part 4 and, in particular, the clamping part comprises a rotation stop 43 (see FIG. 1), against which the rotation fixing element 41 abuts in a rotationally fixing manner to prevent rotation of the second part relative to the first part.

As shown in FIGS. 2 to 6, the vision adjustment mechanism optionally comprises at least one insertion guide 42 for guiding the head part 6 relative to the trough 12 during insertion in a predefined fixing position, as shown, for example, in FIG. 1. This insertion guide optionally allows, in particular, insertion of the head part 6 in the insertion direction $R_E$ into the trough 12 of the first part 2. Optionally, the insertion guide 42 comprises a guiding means 44 on the first part 2, for example, within the trough 12, and a complementary counter guiding means 46 on the head part 6. This counter guiding means 46 is formed here as a receiver, which can receive the guiding means 44 on the first part 2 in such a way that vertical guiding is provided along the axis $A_V$ for the head part 6. A guiding means 44 and the counter guiding means 46 are optionally formed in such a way that any movement deviating from this vertical axis $A_V$, for example in directions coplanar to the pivot plane $E_S$, is prevented.

Furthermore, the insertion guide 42 is also optionally configurable as a rotation fixing means and, in particular, as a rotation fixing means in order to fix the head part 6 relative to the first part 2 in a rotationally fixed manner. This is also achieved by the shape of the guiding means chosen here and the counter guiding means 46 formed in a complementary manner with mutual rotation interlocking, which prevents mutual rotation.

As shown, in particular, in FIGS. 2 to 6, it optionally applies that the trough 12 at least partially comprises a trough sidewall 22 having a geometric shape corresponding to the geometric shape of the sidewall of a spherical layer of a first sphere or a layer of a first volume body being equally rotationally symmetrical. It further optionally applies that the head part 6 at least partially comprises a head part sidewall 26 having a geometric shape at least partially corresponding to the geometric shape of the sidewall of a spherical layer of a second sphere or to the layer of a volume body being equally rotationally symmetrical, and, in particular, a second sphere or a second volume body being equally rotationally symmetrical that is smaller than the first sphere or the rotationally symmetrical first volume body as described before. It also applies optionally that the clamping part 8 at least partially comprises a clamping part sidewall 28 having a geometric shape at least partially corresponding to the geometric shape of the sidewall of a spherical layer of a third sphere or a layer of a third volume body being equally rotationally symmetrical and, in particular, a third sphere or a third volume body being equally rotationally symmetrical that is smaller than the first sphere, or the rotationally symmetrical first volume body and/or larger than the second sphere, or rotationally symmetrical second volume body. As far as the explanations of the present paragraph are concerned, reference is made to the possible embodiments that are discussed in the introductory portion of the present text.

Figure 6:
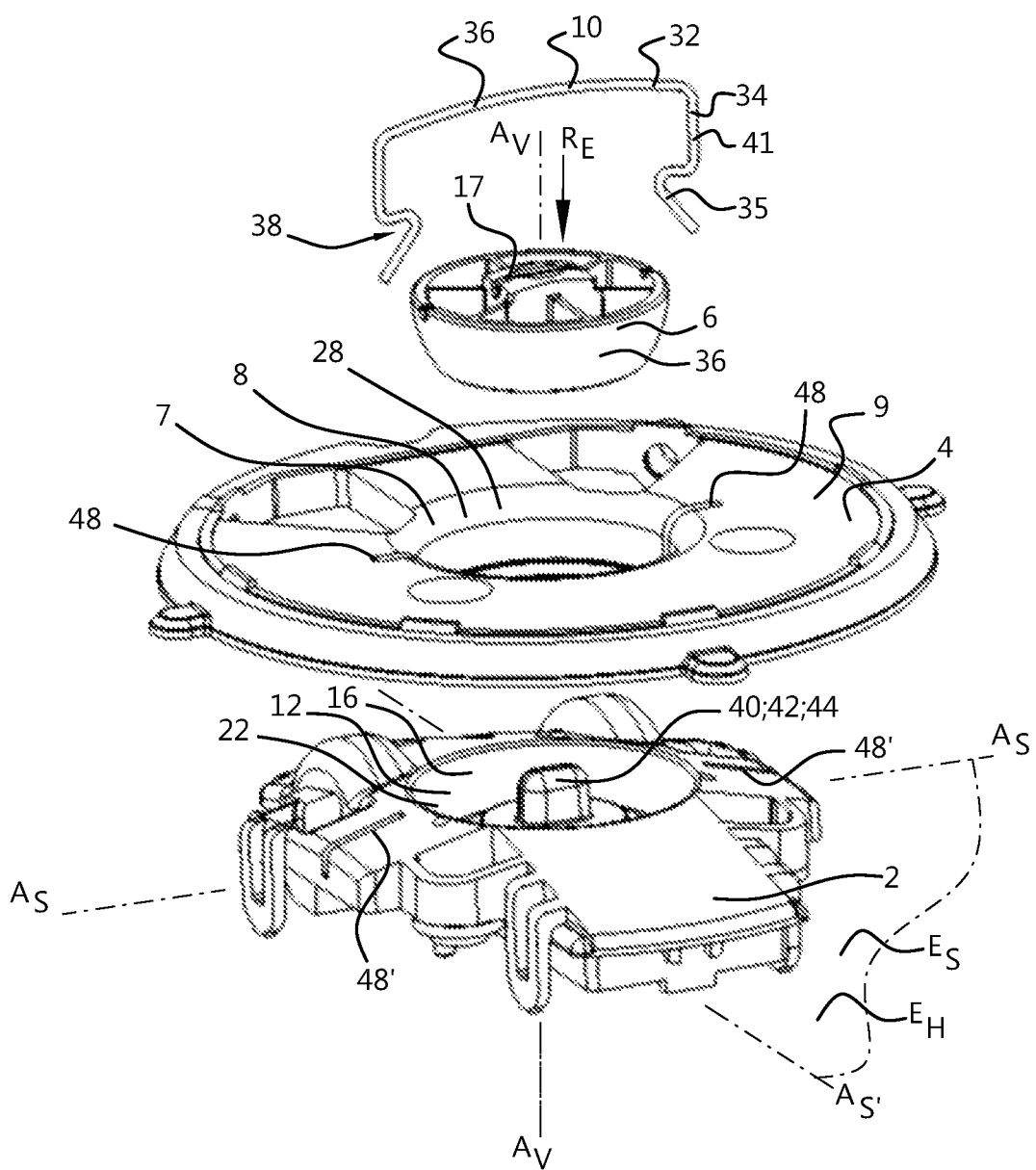
FIG. 6 shows an exploded view of the embodiment of FIG. 1.

The shapes of the trough 12, the clamping part 8 and the head part 6 shown here can be derived, in particular, from the perspective view of FIG. 6. This also demonstrates that it is possible to form components 6, 8, and/or 12 as rotation bodies and, in particular, as rotation bodies having a common rotation body axis $A_V$, in particular in the assembled state.

It can also be seen, and this applies both to trough 12, clamping part 8 and head part 6, that each of the sidewalls 22, 28, 26 can be formed to extend over the entire circumference, i.e., over an angle of 360°, thus, for example, as annular sidewalls. However, it is also possible to form the individual sidewalls only as ring segments, or elements, with sidewall segments, and here, optionally, to arrange a plurality of such ring segments which then form the clamping gap or form the frictional engagement with each of the corresponding complimentary components. Preferably, at least one of the three components 12, 8, 6 is formed as a ring over the entire circumference and the corresponding components are then formed as components having sidewall segments.

Figure 7:
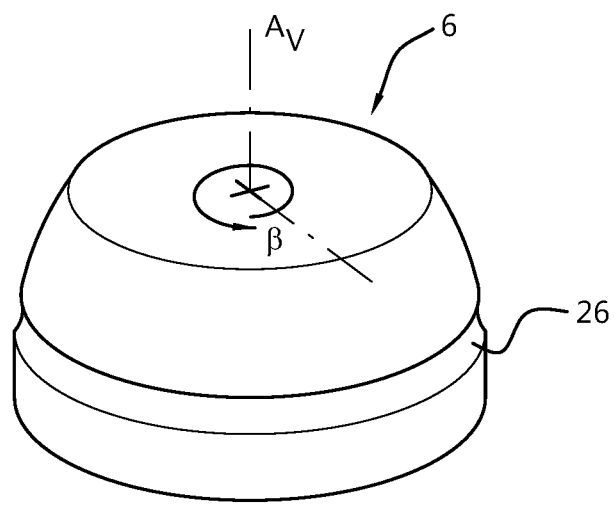
FIG. 7 shows a further embodiment of a head part.
Figure 8:
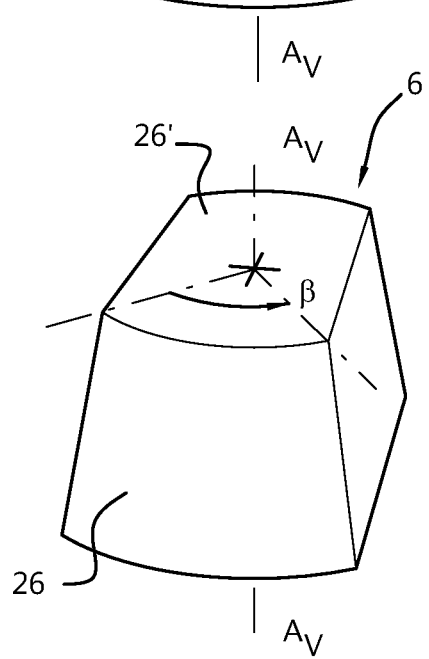
FIG. 8 shows a further embodiment of a head part.
Figure 9:
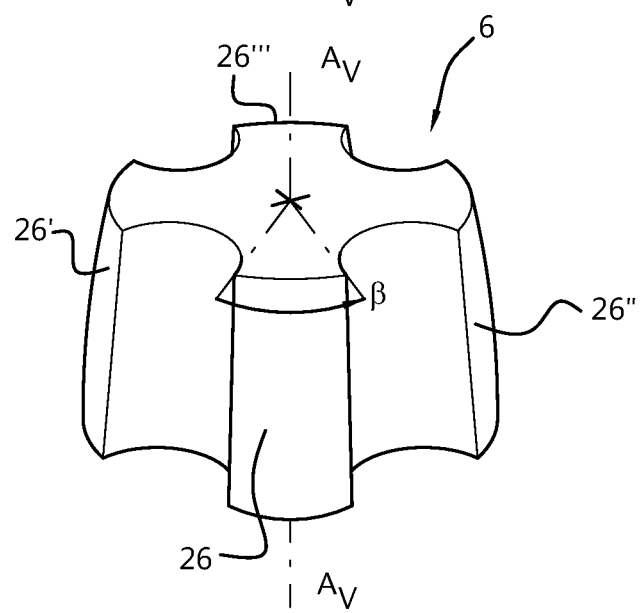
FIG. 9 shows a further embodiment of a head part.

Examples of this are shown in FIGS. 7 to 9, which all show embodiments of head parts 6. The head part 6 shown in FIG. 7 has a disc shape having a head part sidewall 26 extending over an angle β of 360°. Optionally, for example, a groove is shown that extends circumferentially at least in portions of a ring. FIG. 8, however, shows an embodiment in which the head part 6 comprises two sidewall segments 26 of which at least one extends circumferentially over an angle β of less than 360°. The same applies to FIG. 9, wherein the head part 6 shown here comprises more than two, for example four, sidewall segments 26, at least one of which extends circumferentially over an angle β of less than 360°. These embodiments of the sidewalls can also be transferred in a complementary fashion to the sidewalls of the clamping part and/or the trough.

As shown, in particular, in FIGS. 2 to 5, the clamping part 8 optionally comprises at least one frictional element 18, which is provided, in particular, in the form of a thickening and/or a protrusion, in particular on a clamping part sidewall 28 of the clamping part. This frictional element is optionally in frictional engagement with the trough sidewall 22 and/or the head part sidewall 26 in the clamping gap. It is also possible, as has already been explained in the introductory portion, to provide a plurality of such frictional elements and frictional elements, in particular, which are in or come into frictional engagement with the head part sidewall 26, or the trough sidewall 22, in dependence on the pivot angle.

As described, the fixing means 10 is formed such that it biases the head part 6 in the direction towards the first part 2 and, in particular, the trough 12. In this way, a constant clamping force is achieved between clamping part 8 and the two adjacent sidewalls 26, 22 of head part 6 and trough 12. Thus, even when material shrinks, or the like relaxation happens, a reliable frictional engagement, and in particular a spherical joint engagement, of the second part is achieved relative to the first part. This is the case, in particular, when the clamping part 8 is arranged in the clamping gap 14 with frictional engagement and, in particular, in a sliding manner.

It can also be seen in the figures that optionally the first part 2 and the head part 6, connected via the fixing means 10, form a unit fixedly connected to each other, in the clamping gap 14 of which the clamping part 8 is securely mounted.

As shown in FIG. 6, in particular, the trough 12 comprises an insertion opening 16 via which the head part 6 and/or the clamping part 8 are insertable along an insertion direction $R_E$ and, in particular, each along the same insertion direction, into the trough 12 and fixable there by means of the fixing means 10, in particular against removal in a direction opposite to this insertion direction $R_E$. It is also conceivable that after loosening this fixing means 10 this "stacking" can be dismantled and, in particular, the head part and/or the clamping part can be removed from the trough 12.

Optionally, the head part is insertable into the trough 12 along an insertion direction $R_E$ that extends, in particular, orthogonal to the pivot plane $E_S$ and/or orthogonal to a main plane $E_H$ of the trough 12. This is shown, for example, in FIG. 6.

LIST OF REFERENCE NUMERALS 1 vision adjustment mechanism
2 first part
4 second part
6 head part
7 collar region
8 clamping part
9 retaining part
10 fixing means
12 trough
14 clamping gap
16 insertion opening
17 fixing element
18 frictional element
22 trough sidewall
26 head part sidewall
28 clamping part sidewall
30 tension spring means
32 bracket element
34 bracket arm
35 fixing element
36 bracket head
37 counter fixing element
40 rotation fixing
41 rotation fixing element
42 insertion guide
43 rotation stop
44 guiding means
46 counter guiding means
48 penetration opening
$R_E$ insertion direction
$E_H$ main plain of the trough
$E_S$ pivot plane
$A_V$ vertical axis
$A_S$ pivot axis

The invention claimed is:

1. A vision adjustment mechanism, comprising a first part that is a base part, and a second part arranged to be pivotable relative thereto, wherein the second part is a mirror holder part, wherein
the first part comprises a trough, into which a head part that is at least partially complementary to said trough is insertable, forming at least one clamping gap between the trough and the head part and fixable relative to the first part by means of a fixing means, and
the second part comprises at least one clamping part, which is formed to be at least partially complementary to the clamping gap and arrangeable therein in such a manner that the second part is attached to the first part so as to be pivotable relative thereto,
characterized in that
the fixing means is formed in such a way that it biases the head part in the direction towards the first part and in that the fixing means forms a rotation fixing means in such a manner that the second part is fixed against rotation about an axis Av relative to the first part, wherein the axis Av is orthogonal to at least one pivot axis As, about which the second part is pivotable relative to the first part, wherein
the fixing means includes at least one rotation fixing element extending external at a distance to the rotation axis Av, wherein the fixing means extends between the first part and the head part and penetrates the second part;
the fixing means includes a bracket element having at least two bracket arms and a bracket head formed between the bracket arms;
at least one of the at least one fixing element and the bracket head are fixable, wherein the at least one fixing element is formed at the bracket arms, which is fixable on the first part by at least one counter fixing element, or the bracket head is fixable on the head part; and
at least one part of the bracket element forms the rotation fixing element.

2. The vision adjustment mechanism according to claim 1, characterized in that
the clamping part is arranged to be frictionally engaged and is slidably moveable in the clamping gap.

3. The vision adjustment mechanism according to claim 1, characterized in that
the trough has an insertion opening, via which at least one of the head part or the clamping part is insertable along an insertion direction $R_E$ into the trough and fixable there by means of the fixing means from at least one of removal in a direction opposite to the insertion direction $R_E$ or removal after loosening the fixing means.

4. The vision adjustment mechanism according to claim 1, characterized in that
the second part is pivotable relative to the first part about at least one pivot axis As extending orthogonal to an insertion direction $R_E$ along which the head part is insertable into the trough.

5. The vision adjustment mechanism according to claim 1, characterized in that
the trough and the head part are formed to be complementary to each other in such a manner that by interposing the clamping part they form a spherical joint together with the clamping part.

6. The vision adjustment mechanism according to claim 1, characterized in that
the trough at least partially has a trough sidewall having a geometric shape corresponding to a geometric shape of the sidewall of a spherical layer of a first sphere or a layer of a first volume body being equally rotationally symmetrical.

7. The vision adjustment mechanism according to claim 6, characterized in that
the head part at least partially includes a head part sidewall, having a geometric shape at least partially corresponding to the geometric shape of the sidewall of a spherical layer of a second sphere or a layer of a second volume body being equally rotationally symmetrical, wherein the second sphere or the second volume body being equally rotationally symmetrical is smaller than the first sphere or the rotationally symmetrical first volume body.

8. The vision adjustment mechanism according to claim 7, characterized in that
the clamping part at least partially includes a clamping part sidewall having a geometric shape at least partially corresponding to the geometric shape of the sidewall of a spherical layer of a third sphere or a layer of a third volume body being equally rotationally symmetrical,
and the third sphere or the third volume body being equally rotationally symmetrical that is at least smaller than the first sphere or the rotationally symmetrical first volume body, or larger than the second sphere or the rotationally symmetrical second volume body.

9. The vision adjustment mechanism according to claim 8, characterized in that
the clamping part includes at least one frictional element provided on the clamping part sidewall of the clamping part, wherein the at least one frictional element is in the shape of a thickening or a protrusion, and the clamping part is in frictional engagement with at least one of a trough sidewall and a head part sidewall in the clamping gap.

10. The vision adjustment mechanism according to claim 1, characterized in that
the fixing means includes at least one tension spring means fixable on the first part and on the head part while applying mutual biasing.

11. The vision adjustment mechanism according to claim 1, characterized in that
the at least one fixing element is formed on the end regions of the bracket arm.

12. The vision adjustment mechanism according to claim 1, characterized in that
the fixing means is formed as a snap-engagement means, which can brought into or out of a fixing snap engagement, wherein the fixing means is brought into a snap-engagement means with at least one of the first part or the head part without a use of a tool, and the fixing means is brought out of the fixing snap engagement with at least one of the first part or the head part by means of a detachment tool.

13. The vision adjustment mechanism according to claim 1, further comprising an insertion guide,
characterized in that
the insertion guide is provided between the first part and the head part wherein the first part comprises a guiding means, wherein the guiding means is located in the trough and the head part comprises a complementary counter guiding means on the head part, for guiding the head part relative to the trough during insertion in a predefined fixing position.

14. The vision adjustment mechanism according to claim 13, characterized in that
the insertion guide is formed as a means for rotationally fixing the head part relative to the first part.

15. The vision adjustment mechanism according to claim 1, characterized in that
at least one of the head part and the trough, the head part and the clamping part, or the trough and the clamping part, at least in relation to each of their opposing sidewalls, are at least partially formed as rotationally symmetrical bodies having a common axis of rotation (Av), wherein,
the fixing means connects the first part to the head part in a manner offset from the common axis of rotation (Av).

16. The vision adjustment mechanism according to claim 1, characterized in that
the clamping part is at least partially formed as an annular element, having a collar region on which at least one holding means is formed for receiving at least one mirror element.

17. A mirror unit for an automotive vehicle, comprising the vision adjustment mechanism according to claim 1, wherein at least one mirror element is arranged on the second part.

* * * * *